A. G. HALFPENNY & J. A. BERGSTROM.
TYPE SETTING AND DISTRIBUTING MACHINE.
APPLICATION FILED NOV. 29, 1907.

936,776.

Patented Oct. 12, 1909.
6 SHEETS—SHEET 2.

A. G. HALFPENNY & J. A. BERGSTROM.
TYPE SETTING AND DISTRIBUTING MACHINE.
APPLICATION FILED NOV. 29, 1907.

936,776.

Patented Oct. 12, 1909.
6 SHEETS—SHEET 5.

WITNESSES:

INVENTORS
Arthur G. Halfpenny
John A. Bergstrom
BY
ATTORNEYS

UNITED STATES PATENT OFFICE.

ARTHUR GEORGE HALFPENNY, OF WEST HOBOKEN, AND JOHN A. BERGSTROM, OF PASSAIC, NEW JERSEY.

TYPE SETTING AND DISTRIBUTING MACHINE.

936,776.  Specification of Letters Patent.  Patented Oct. 12, 1909.

Application filed November 29, 1907. Serial No. 404,241.

*To all whom it may concern:*

Be it known that we, ARTHUR GEORGE HALFPENNY and JOHN A. BERGSTROM, citizens of the United States, and residents, respectively, of West Hoboken, in the county of Hudson and State of New Jersey, and of Passaic, in the county of Passaic and State of New Jersey, have invented a new and Improved Type Setting and Distributing Machine, of which the following is a full, clear, and exact description.

The invention relates to printing and its object is to provide a new and improved typesetting and distributing machine, arranged to permit accurate and quick setting of the type into a chase for removal and use in a printing press, to make the desired impression of the type set up, to allow distribution of the type from the chase after the desired number of impressions have been made, and to permit setting up of different sized types in the same chase.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Fig. 3 is a transverse section of the same on the line 3—3 of Fig. 1.

The typesetting and distributing machine is mounted on a suitably constructed main frame A, on the top of which is mounted to slide longitudinally the carrier or holder B supporting the removable type case or magazine C having transverse parallel guideways C' for the reception and retention of the types D, arranged in lines of the same letter, sign or other character, the said type case or magazine C being fastened in place on the carrier or holder B by set screws E or other fastening devices, to allow of using type cases or magazines having different sets of types. Each of the guideways C' is adapted to register with any one of similar guideways F' formed transversely in a chase F of segmental shape and removably attached to the peripheral face of a segmental drum G by the use of screws G' or other fastening devices.

By the arrangement described the chase F with the type set up therein can be removed from the drum G for use on a printing press or for making electroplates. The filled chase, after use has been made of the same, is returned to the drum G and fastened thereon by the set screws G', after which the type in the said chase is returned to or distributed in the type case C, as hereinafter more fully described.

The drum G is mounted to turn to allow of bringing any one of the guideways F' into a top or registering position with a corresponding guideway C' of the type case C. The drum G is mounted to turn loosely on a spindle $G^2$, attached to the main frame A, and the front end of the hub of the drum G is provided with a knob or handle $G^3$, adapted to be taken hold of by the operator for turning the drum G, to bring the desired guideway F' into a top or registering position. A lock nut G⁴ screws on the outer threaded end G⁵ of the spindle G² and abuts against the knob or handle G³, to lock the latter and consequently the drum G and the chase F in the adjusted position.

Figure 1:
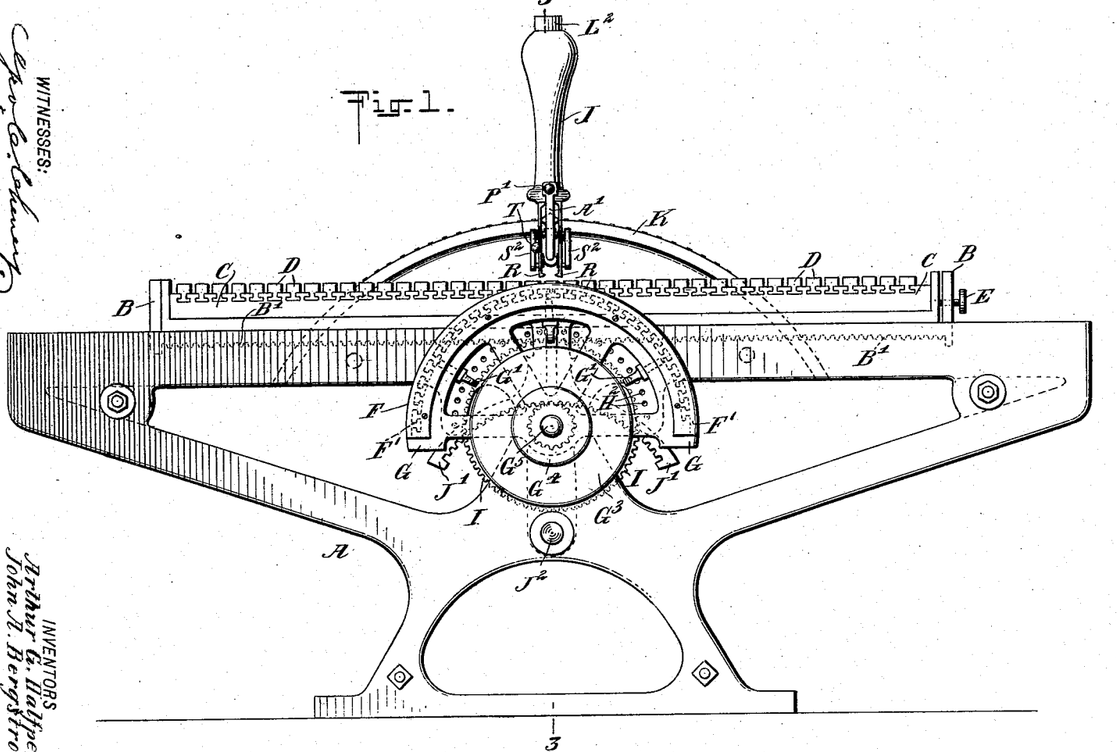
Figure 1 is a side elevation of the improvement.

In order to bring the top guideway F' into accurate registry with a corresponding guideway C' on the type case C, a locking pin H (see Fig. 3) is used and mounted to slide on the inner end of the drum G, and this locking pin H is pressed on by a spring H' and is adapted to engage one of a series of recesses H², arranged in a segment of a circle on the main frame A, see Fig. 1. Now when the lock nut G⁴ is unscrewed and the operator turns the knob G³ and thereby the drum G and the chase F until the desired guideway F' is on top, then the pin H engages an aperture H² and thus brings a guideway F' of the chase F in accurate registration with a corresponding guideway C' in the type case C and holds the drum G and the chase F locked sufficiently tight until the lock nut G⁴ is screwed up against the handle G³.

Figure 2:
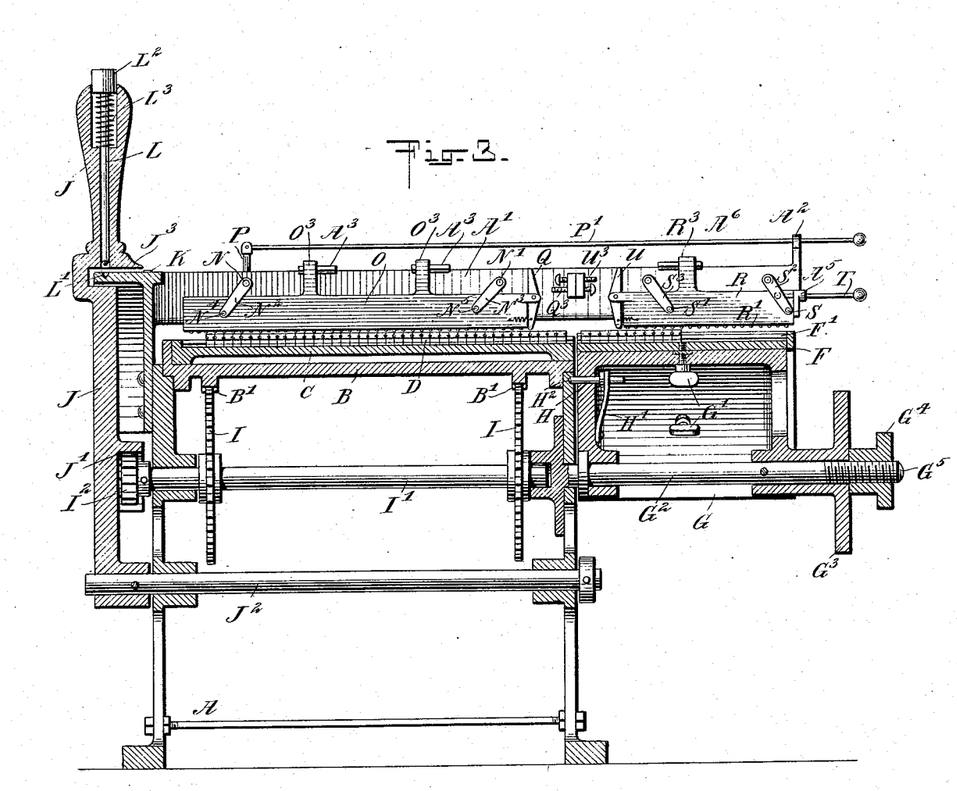
Fig. 2 is a plan view of the same.

In order to move the carrier B and its type case C in a longitudinal direction, to bring any one of the guideways C' in register with a guideway F', then in a top or registering position, the following arrangement is made: On the under side of the carrier B are secured or formed longitudinally extending racks B' in mesh with gear wheels I, secured on a shaft I', journaled in suitable bearings on the main frame A, one end of the shaft I' being provided with a pinion I² in mesh with an internal segmental gear wheel J', formed or attached to a handle J, fulcrumed at J² on the main frame A. Now when the handle J is swung over to the right or left by the operator, then the segmental gear wheel J' turns the pinion I² and consequently the shaft I' and the gear wheels I, so that the latter impart a longitudinal traveling motion to the racks B' and the holder B carrying the type case C supporting the types D. The handle J is provided with a pointer J³, indicating on a segmental dial K, provided with the letters of the alphabet and other signs and characters corresponding to the sets of types D contained in the several guideways C' of the type case C. Thus when the handle J is in the position illustrated in Figs. 1, 2 and 3, the pointer J³ indicates on the letter "a" on the dial K, thus signifying that the groove C' containing the small letter "a" types is in registering position with the top guideway F' of the chase F. When the handle J is swung over to the left until the pointer J³ indicates on the capital letter "G", then the holder B and the type case C are shifted from the right to the left until the guideway C' containing the capital letter "G" types is in register with the top guideway F' of the chase F. In a like manner when the handle J is swung over to the right until the pointer J³ stands opposite the letter "o", then the holder B and the type case C have been shifted from the left to the right until the guideway C' containing the small letter "o" types is in register with the top guideway F' of the chase F.

From the foregoing it will be seen that by the operator moving the handle J to the right or left until the pointer J³ indicates on a desired letter, sign or other character, then the holder B and the type case C are shifted, to bring the guideway C' having the corresponding letter type, sign type or character type in registering position with the top guideway F' of the chase F. The handle J is provided with a spring-pressed locking pin L, adapted to engage one of a series of recesses L' formed on the dial K, to lock the handle J and consequently the holder B and the type case C in the position they are in at the time. The pin L is provided at its upper end with a button L² projecting above the top of the handle J, so as to permit the operator to conveniently press the said pin L into a locking position whenever it is desired to do so. A spring L³ normally holds the locking pin L in an uppermost inactive position, as indicated in Fig. 3.

Figures 4, 6, 8:
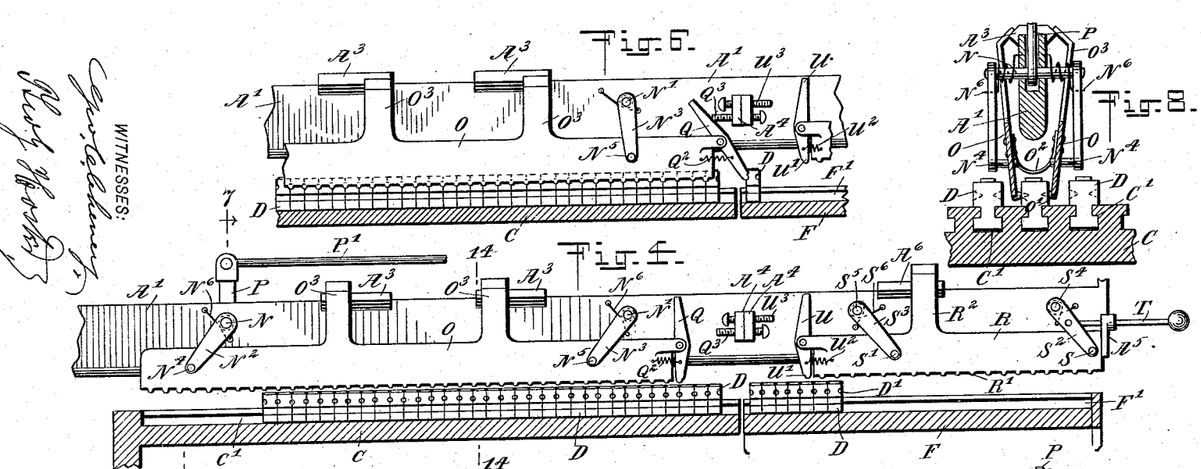
Fig. 4 is an enlarged transverse section of the type case, the chase and the type-shifting mechanism in normal inactive position.
Fig. 6 is a similar view of the same and showing the type-shifting mechanism in position for pushing the end type from the type case guideway into the registering chase guideway.
Fig. 8 is a similar view of the same on the line 8—8 of Fig. 5.
Figure 7:
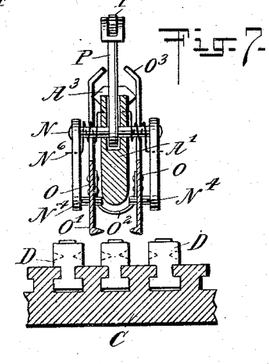
Fig. 7 is an enlarged transverse section of the same on the line 7—7 of Fig. 4.
Figures 9, 12:
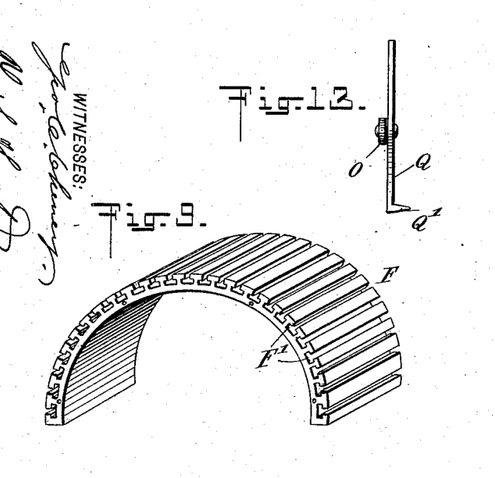
Fig. 9 is a perspective view of the chase.
Fig. 12 is a similar view of one of the locking blocks for locking the types in position in the chase.
Figures 10, 11, 14:
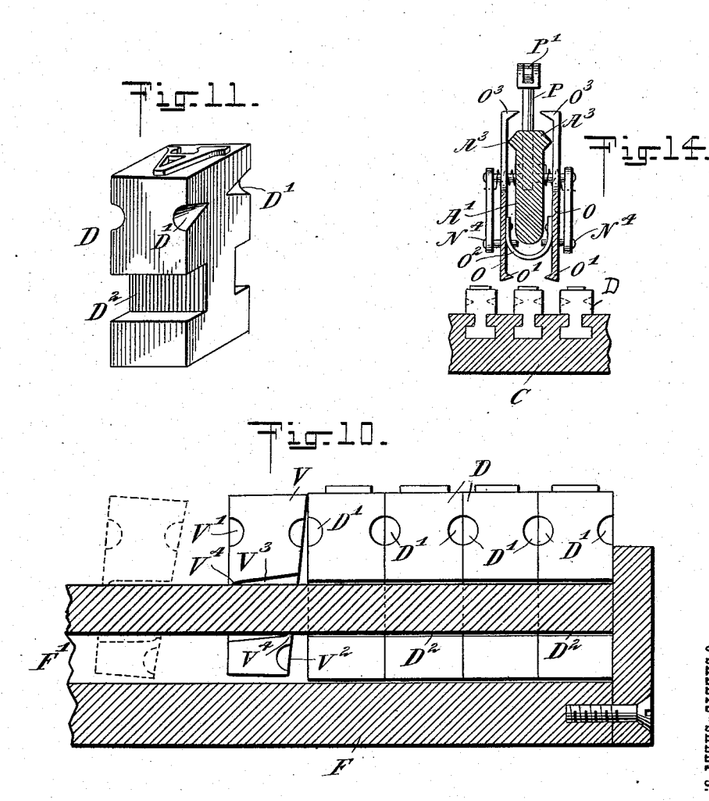
Fig. 10 is an enlarged transverse section of the chase and the type set up and locked therein.
Fig. 11 is an enlarged perspective view of one of the types.
Fig. 14 is an enlarged sectional side elevation of the type case and the type-shifting mechanism, the section being on the line 14—14 of Fig. 4.
Figure 13:
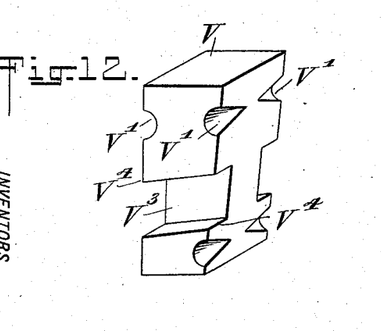
Fig. 13 is an enlarged side elevation of one of the end typeshifting levers.

In order to move one or more of the types D from a registering guideway C' into the top guideway F' of the chase F, a manually controlled shifting device is used, arranged as follows: A supporting arm A' attached to the main frame A extends transversely over the registering guideways C', F', and on the said supporting arm A' are journaled the shafts N, N' provided on opposite sides of the supporting arm A' with sets of parallel swing arms N², N³, extending downwardly and carrying at their lower ends pins N⁴, N⁵, on which are mounted shifting plate O for engaging the opposite sides of the types D in the groove C' held in registering position at the time. The shaft N is provided with an upwardly-extending arm P pivotally connected with the rear end of a rod P', sliding in a bearing A² arranged on the free end of the supporting arm A'. The swing arms N², N³ are pressed on by springs N⁶ to normally hold the same in a raised position, as shown in Figs. 3 and 4, thus holding the shifting plates O sufficiently high up for the types D to readily pass under the plates O on shifting the carrier B and the type case C to the right or left, as above explained. The lower edges of the shifting plates O are provided with lugs or points O' extending toward each other (see Figs. 7, 8 and 14), for engaging correspondingly shaped recesses or indentations D' formed in the sides of the types D at the corners thereof (see Figs. 11 and 12), and which indentations are above the grooves $D^2$ formed in the sides of the types D, for engaging the guideways $C'$ or $F'$. The lugs $O'$ are spaced apart to engage the registering indentations of adjacent types D (see Figs. 5 and 8). The plates O are pressed apart by springs $O^2$ and are adapted to swing inward with a view to engage the lugs $O'$ with the indentations $D'$, and for this purpose the plates O are provided with inwardly extending cam arms $O^3$ adapted to engage cam surfaces $A^3$ formed on the supporting arm $A'$. Now when the several parts are in the position illustrated in Figs. 4, 7 and 14, then the plates O are in an uppermost position and are held spaced apart by the springs $O^2$, the upper ends of the cam arms $O^3$ being a distance above the cam surfaces $A^3$. Now when the operator pushes the rod $P'$ inwardly then a swinging motion is given to the arms $N^2$, $N^3$, whereby the plates O are swung downward, to bring the lugs or points $O'$ opposite the indentations $D'$, and at this time the upper ends of the cam arms $O^3$ engage the cam surfaces $A^3$, so that the plates O are swung inward toward each other against the tension of the springs $O^2$, to engage the lugs or points $O'$ with the indentations $D'$. Now on a further inward pushing of the rod $P'$, the plates O swing forward, and in doing so carry the types D along, thus shifting the types in their guideways $C'$ (see Figs. 6 and 8).

Figure 5:
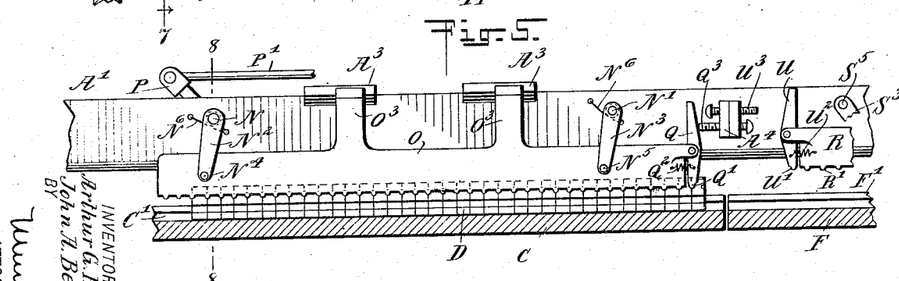
Fig. 5 is a like view of the same and showing the type-shifting mechanism in active position.

In order to shift the end type from the guideways $C'$ into the guideways $F'$ at the time the plates O shift the types D forward, the following arrangement is made, special reference being had to Figs. 4, 5 and 6. On the forward ends of the plates O are fulcrumed levers Q, provided at their lower ends with lugs or points $Q'$, similar to the points $O'$ on the plates O, to engage the indentations in the end type D. The lever Q is pressed on by a spring $Q^2$, to normally hold the same in a vertical position, and the said lever Q is adapted to abut against a stop pin $Q^3$ in the form of a screw screwing in a projection $A^4$ arranged on the arm $A'$. Now when the plates O swing forward to the position shown in Fig. 5, then the upper ends of the levers Q engage the stop pins $Q^3$, and on the further forward movement of the said plates O, a swinging motion is given to the said levers Q, to shift the end type D from the guideway $C'$ into the guideway $F'$, as indicated in Fig. 6. It is understood that the swinging motion given to the lever Q is considerably in excess of the forward movement of the plates O, so that the end type is transferred from the guideway $C'$ into the guideway $F'$ previous to the next following type nearing the end of the guideway $C'$. Thus by the arrangement described a positive transferring of the end type D from the guideway $C'$ into the registering top guideway $F'$ is had and without danger of the end type sticking between the guideways $C'$ and $F'$, to be crushed or otherwise injured on changing the positions of either the type case C or the chase F.

In order to move one or more types D from the top guideway $F'$ back into the proper guideway $C'$ for receiving the type, the following shifting device is provided, and which shifting device is essentially like the one for shifting the types D from the guideway $C'$ into the guideway $F'$: Shifting plates R are arranged on opposite sides of the supporting arm $A'$ and are provided at their lower ends with lugs or points $R'$ for engaging the indentations $D'$ in the sides of the types D. The plates R are hung on pins S, $S'$ carried on the lower ends of swing arms $S^2$, $S^3$ attached to the shafts $S^4$, $S^5$ journaled in the supporting arm $A'$. Springs $S^6$ press the arms $S^2$, $S^3$, to normally hold the plates R in an uppermost position, to allow the types D in the chase F to pass under the said plates when turning the drum G and the chase F attached thereto. A rod T is pivotally connected with one of the arms $S^2$ (see Figs. 3 and 4), and is mounted to slide in a bearing $A^5$ attached to the outer end of the supporting arm $A'$. Now, on the operator pressing the rod T, the plates R are swung downward, similar to the plates O, and are moved inward by cam-arms $R^2$, engaging cam-surfaces $A^6$ on the supporting-arm $A'$, the same as above described in reference to the cam-arms $O^3$ and the cam-surfaces $A^3$. On the inner end of each plate R is fulcrumed a shifting-lever U, provided at its lower end with a lug or point $U'$ for engaging the indentation $D'$ of the end type to be shifted from the guideway $F'$ back into the guideway $C'$. The lever U is pressed on by a spring $U^2$ and is adapted to engage a stop-pin $U^3$ held adjustably in a bearing $A^4$ above the stop-pin, so that when the plates R are swung downward the levers U finally engage the stop-pins $U^3$, whereby a swinging motion is given to the levers U, to shift the end type D from the guideway $F'$ over into the guideway $C'$ of the type-case C. From the foregoing it will be seen that by the arrangement described the types D can be distributed from the chase F back into the type-case C.

Instead of engaging the recesses $D'$ at the sides of the type D by the lateral projections on the plates O and R and the levers Q and U, as above described, the types D may be provided at the sides with ribs or lugs $D^3$ for engagement by depending arms on the said plates O and R and the levers Q and U for shifting the types along (see Fig. 17) If desired, the types D may be provided with vertical recesses $D^4$, to be engaged by lateral arms on the plates O and R and the levers Q and U (see Fig. 18), for shifting the types along the guideways.

In order to lock the types D in a guideway F' of the chase F, use is made of a locking block V, of which any desired number are held in the guideway C' of the type case C, so that any one of the locking blocks V can be shifted from the guideway C' into the guideway F' whenever it is desired to lock a row of assembled type in the said guideway F'. The locking block V is provided with indentations V' similar to the indentations D', for engagement by the lugs or points O' and R' for shifting the block, as previously explained relative to the types D. The front face V² of the block V is beveled and its side grooves V³ are diverging relative to the face of the block V, as plainly indicated in Fig. 10, so that when the block V is pushed up by hand against the last type D in the row, then the ends V⁴ of the walls of the grooves V³ bite into the guideways F', thus holding the block V against return movement, thereby locking the device D securely in place, as will be readily understood by reference to Fig. 10.

If small type is set up in the chase F, it is of advantage in unloading or distributing to use the shifting plate R on one side of the supporting arm A' only (see Fig. 16) the shifting plate R on the other side of the supporting arm A' being raised by hand into an inactive position. The raised plate is the one which otherwise would go between adjacent rows of type.

Figures 15, 16, 17, 18:
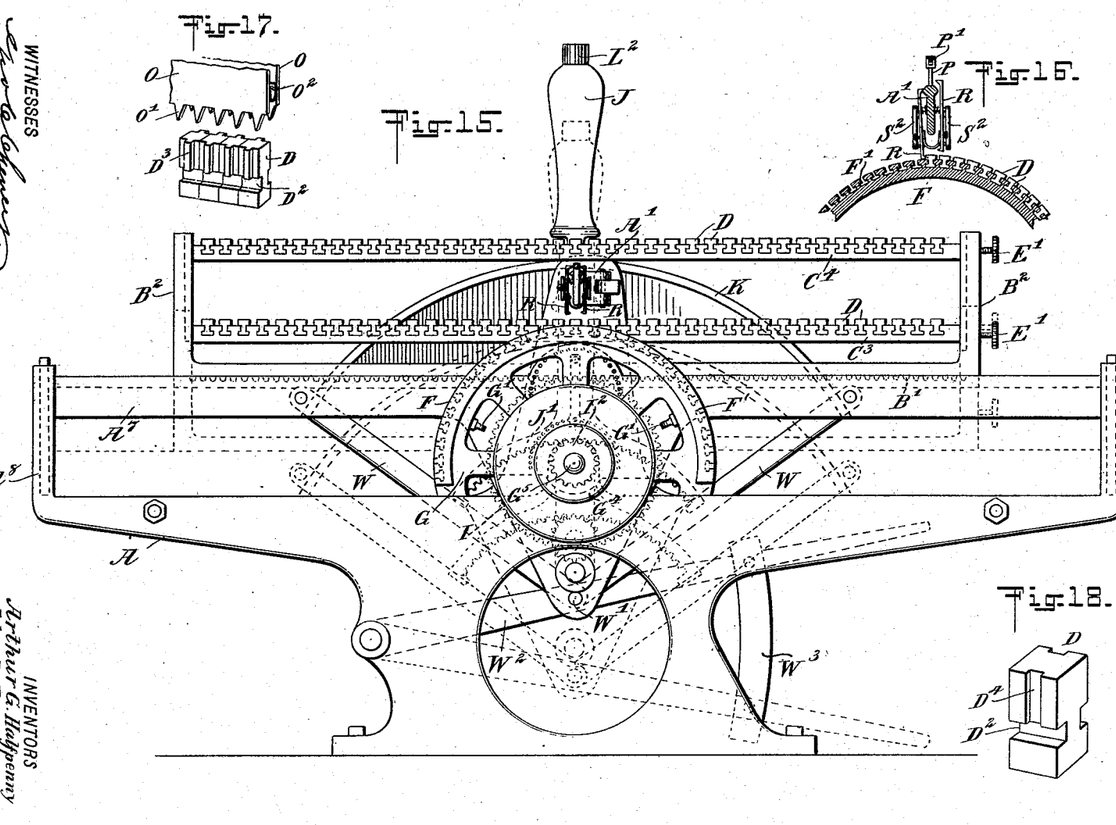
Fig. 15 is a side elevation of the improvement as arranged for setting type from different type cases.
Fig. 16 is a sectional side elevation of the chase and the type-shifting mechanism as arranged for setting small type close in the chase.
Fig. 17 is a perspective view of a modified form of type and the shifting mechanism for the same.
Fig. 18 is a similar view of another modified form of type.

When it is desired to use two or more type cases filled with different styles of types, use is made of a holder or carrier B², adapted to support a number of type cases C³, C⁴, one above the other, as plainly shown in Fig. 15. The type cases C³, C⁴ are removably secured in place in the holder or carrier B² by set screws E'.

The carrier or holder B² is mounted to travel on a bed A⁷ held vertically slidable in guideways A⁸ arranged on the ends of the frame A, and the said bed A⁷ is pivotally connected by links W with a pivot W' held on the bed A⁷, the latter being raised or lowered by a hand-lever W² under the control of the operator and adapted to be locked in either position on a quadrant W³. The bed A⁷ carries the hand-lever J, dial K and the gearing for shifting the carrier or holder B² longitudinally, to bring a desired guideway C' of either type-case C³ or C⁴ in registering position with the top guideway F' of the chase F, it being understood that the carrier B² is raised or lowered, to bring the desired type-case C³ of C⁴ to the level of the top of the chase F. As shown in Fig. 15, the type-case C³ is in an active position at the time.

The supporting-arm A' carrying the type-shifting mechanisms for setting the type in the chase F or for distributing the type from the chase F back to either type-case, is hinged on the main frame A, to allow of swinging the said arm A' and the parts supported thereby to one side, in order to permit raising or lowering the carrier or holder B² and the type cases C³, C⁴ held thereon. After the desired type-case is in operative position, the supporting arm A' is swung back into normal or active position.

The operation for setting type is as follows: When the several parts are in the position shown in Figs. 1, 2, 3 and 4, then the operator turns the drum G to bring a desired chase guideway F' for receiving a line of composition into a top or active position, after which the drum G and the chase F are locked in place, as previously explained. The operator now takes hold of the handle J and swings the same to the right or left, so as to shift the type case C correspondingly, to bring a desired set of type D in the type case C into registering position with the guideway F'. The operator now presses the rod P' to engage the plates O with the set of types beneath it (see Fig. 5) and to shift the set of types forward (see Fig. 6) and to cause the levers Q to push the end type out of the guideway C' into the guideway F' of the chase F. When this has been done the operator releases the rod P', so that the type-shifting mechanism returns to its normal position by the action of the springs N⁶. Now when another type is required in the line of composition, the operator swings the handle J again to the right or the left until the desired set of type D is brought into active position, that is, in alinement with the top guideway F'. The operator again presses the rod P' to actuate the type-shifting mechanism, as before explained, so that the end type of this set of types is moved from the guideway C' into the guideway F', next to the type already in place therein, the second type pushing the first type along in the guideway F'.

The above-described operation is repeated until the line of composition is completed, and when this has been done the line of composition is locked in place by the locking block V, transferred from the corresponding guideway C' of the type case C to the guideway F' by the operator manipulating the handle J and the rod P', as above explained in transferring the types D. The line of composition if it does not fill the entire guideway F' can be pushed to a desired position by hand and then locked in place by pushing up the locking block V (see Fig. 10). In case different kinds of type for head lines and the like are desired, use is made of a number of type cases C³, C⁴, as shown in Fig. 15 and above explained. After the line of composition is completed, the operator unlocks the drum G and then turns the same, to bring another chase guideway F' to a top position, after which the drum G is again locked in place and the above described operation is repeated for forming another line of composition. After the chase is filled with the desired number of lines of composition, the chase is unlocked from the drum G and removed therefrom, to be then attached to a printing press for making the desired number of impressions. In the meantime, another empty chase F may be placed in position on the drum G and filled with lines of composition, as above explained. After a filled chase has been used on the printing press it is returned to the drum G for distribution of the type, packed into the corresponding guideways C' of the type case C. In order to do this the operator first swings the handle J to one side or the other, to bring the guideway C' having the kind of type corresponding to the first type in the top guideway F' opposite the latter, and then the operator presses the rod T, to actuate the shifting plates R and the lever U, for transferring the end type from the guideway F' to the guideway C' and alongside the same kind of type therein.

The above-described operation is repeated for each type in the top guideway F' until the entire line of composition has been distributed in the type case C. When this has been done, the operator unlocks the drum G and then turns the same, to bring the next line of composition into a top position, after which the drum G is again locked and the above-described operation is repeated, to distribute this type of the second line of composition back to the type case C.

From the foregoing it will be seen that the apparatus can be continually used, either for setting type or for distributing type, as a filled chase can be removed from the drum G and used for printing or for making electroplates, while an empty chase is filled or the type in a filled chase is distributed, as above explained.

Having thus described our invention, we claim as new and desire to secure by Letters Patent;

1. In combination, a flat type case mounted to move longitudinally and having transverse guideways for holding types, a removable segmental chase mounted to turn and arranged adjacent to the said type case, the said chase having transverse guideways adapted to register with the guideways in the said type case, and means for shifting the type from one registering guideway into the other.

2. In combination, a type case having transverse guideways and mounted to move longitudinally, a drum adapted to be turned, a segmental chase removably secured to the said drum and having transverse guideways adapted to be brought in register with the guideways of the said type case, and means for shifting the types from one registering guideway into the other.

3. In combination, a plurality of type cases one above the other, and each having guideways, means for raising or lowering the said type cases to move any one of the type cases into operative position, means for shifting the type cases longitudinally, to move any one of the guideways into operative position, a receiving member having guideways adapted to register with the guideways of the type cases, and means for shifting the types from one of the registering guideways into the other.

4. In combination, a plurality of type cases one above the other and each having guideways, means for raising or lowering the said type cases to move any one of the type cases into operative position, means for shifting the type cases longitudinally to move any one of the guideways into operative position, a movable chase having guideways adapted to register with the guideways in the type cases, and means for shifting the types from one of the registering guideways into the other.

5. In combination, a plurality of type cases one above the other and each having guideways, means for raising or lowering the said type cases to move any one of the type cases into operative position, means for shifting the type cases longitudinally to move any one of the guideways into operative position, a drum adapted to be turned, a segmental chase removably secured to the said drum and having transverse guideways adapted to be brought into register with the guideways on the said type cases, and means for shifting the types from one registering guideway into the other.

6. A typesetting and distributing machine comprising a flat type case having parallel transverse guideways for the types, means for shifting the type case longitudinally to bring any one of the guideways into operative position, a drum mounted to turn and arranged adjacent to the said type case, a segmental chase removably secured to the said drum and having guideways parallel to the axis of the drum and adapted to register with the type case guideway in operative position at the time, a supporting arm in alinement with and arranged over the registering guideways, and manually controlled type-shifting devices mounted on the said arm independent one of the other, the said shifting devices having engaging means for engaging the types in the registering guideways and for shifting the same from one guideway to the other.

7. A typesetting and distributing machine comprising a flat type case having parallel transverse guideways for the types, means for shifting the type case longitudinally to bring any one of the guideways into operative position, a drum mounted to turn and arranged adjacent to the said type case, a segmental chase removably secured to the said drum and having guideways parallel to the axis of the drum and adapted to register with the type case guideway in operative position at the time, a supporting arm in alinement with and arranged over the registering guideways, and a manually controlled type-distributing device mounted on the said arm and adapted to engage the type in the registering guideway of the type case and to shift the same into the registering guideway of the said chase.

8. A typesetting and distributing machine comprising a flat type case having parallel transverse guideways for the types, means for shifting the type case longitudinally to bring any one of the guideways into operative position, a drum mounted to turn and arranged adjacent to the said type case, a segmental chase removably secured to the said drum and having guideways parallel to the axis of the drum and adapted to register with the type case guideway in operative position at the time, a supporting arm in alinement with and arranged over the registering guideways, and a movable plate mounted on the said arm for engaging a side of the types in one of the registering guideways for shifting the type into the other registering guideway.

9. A typesetting and distributing machine comprising a flat type case having parallel transverse guideways for the types, means for shifting the type case longitudinally to bring any one of the guideways into operative position, a drum mounted to turn and arranged adjacent to the said type case, a segmental chase removably secured to the said drum and having guideways parallel to the axis of the drum and adapted to register with the type case guideway in operative position at the time, a supporting arm in alinement with and arranged over the registering guideway, a plate mounted to swing on the said arm and having means for engaging a side of the types in one of the registering guideways, and manually controlled means for imparting a swinging motion to the said plate.

10. A typesetting and distributing machine comprising a flat type case having parallel transverse guideways for the types, means for shifting the type case longitudinally to bring any one of the guideways into operative position, a drum mounted to turn and arranged adjacent to the said type case, a segmental chase removably secured to the said drum and having guideways parallel to the axis of the drum and adapted to register with the type case guideway in operative position at the time, a supporting arm in alinement with and arranged over the registering guideways, a plate mounted to swing on the said arm and having means for engaging a side of the types in one of the registering guideways, manually controlled means for imparting a swinging motion to the said plate, a lever on the said plate and adapted to engage the end type of the types in the guideway, and means on the said arm for imparting a swinging motion to the said lever.

11. A typesetting and distributing machine comprising a flat type case having parallel transverse guideways for the types, means for shifting the type case longitudinally to bring any one of the guideways into operative position, a drum mounted to turn and arranged adjacent to the said type case, a segmental chase removably secured to the said drum and having guideways parallel to the axis of the drum and adapted to register with the type case guideway in operative position at the time, a supporting arm in alinement with and arranged over the registering guideways, a plate mounted to swing on the said arm and having means for engaging a side of the types in one of the registering guideways, manually controlled means for imparting a swinging motion to the said plate, a spring-pressed lever on the said plate and adapted to engage the end type of the types in the guideway, and a pin on the said arm and engaged by the said lever to actuate the latter on imparting a swinging motion to the said plate.

12. A typesetting and distributing machine comprising a flat type case having parallel transverse guideways for the types, means for shifting the type case longitudinally to bring any one of the guideways into operative position, a drum mounted to turn and arranged adjacent to the said type case, a segmental chase removably secured to the said drum and having guideways parallel to the axis of the drum and adapted to register with the type case guideway in operative position at the time, a supporting arm in alinement with and arranged over the registering guideways, plates on opposite sides of the said arm and having means for engaging the sides of the type in one of the registering guideways, swing arms on the said supporting arm and having pins on which the plates are mounted, cams on the said supporting arm and adapted to be engaged by the said plates, and manually controlled means for imparting movement to one of the said swing arms.

13. A typesetting and distributing machine comprising a flat type case having parallel transverse guideways for the types, means for shifting the type case longitudinally to bring any one of the guideways into operative position, a drum mounted to turn and arranged adjacent to the said type case, a segmental chase removably secured to the said drum and having guideways parallel to the axis of the drum and adapted to register with the type case guideway in operative position at the time, a supporting arm in alinement with and arranged over the registering guideways, plates on opposite sides of the said arm and having means for engaging the sides of the type in one of the registering guideways, swing arms on the said supporting arm and having pins on which the plates are mounted, arms on the said supporting arm and adapted to be engaged by the said plates, manually controlled means for imparting movement to one of the said swing arms, a spring-pressed lever on one end of the said plate and having means for engaging the end type, and a pin on the said supporting arm for engagement by the said lever to actuate the latter.

14. A typesetting and distributing machine provided with a type case having guideways, a chase having guideways adapted to register with the guideways in the type case, and a shifting device having movement for bodily shifting the types in one of the guideways and provided with a shifting lever having additional movement for shifting one end type from one guideway into the other.

15. A typesetting and distributing machine provided with a type case having guideways, a chase having guideways adapted to register with the guideways in the type case, a shifting device having movement for bodily shifting the types in one of the guideways and provided with a shifting lever having additional movement for shifting one end type from one guideway into the others, and means for locking the type-case and chase in place at the time the desired guideways are in registering position.

16. In a typesetting and distributing machine, a bed movable up and down, a carrier mounted to slide lengthwise on the said bed, and type-cases held one above the other on the said carrier and each provided with guideways for the types.

17. In a typesetting and distributing machine, a bed movable up and down, a carrier mounted to slide lengthwise on the said bed, type-cases held one above the other on the said carrier and each provided with guideways for the types, and a movable member having guideways, either of which can be brought in register with a guideway of either type-case.

18. In mechanism of the class described, a type case comprising a plurality of superposed horizontally extending trays vertically spaced from each other and provided with parallel ways adapted to carry rows of type, said type case being movable in a vertical direction to bring any one of said trays into a plane with a relatively fixed discharge point and in a direction transverse to such way to bring a selected way in the member thus positioned into alinement with such discharge point.

In testimony whereof we have signed our names to this specification in the presence of two subscribing witnesses.

ARTHUR GEO. HALFPENNY.
JOHN A. BERGSTROM.

Witnesses:
EVERARD B. MARSHALL,
F. W. HANAFORD.